Feb. 23, 1971 S. C. M. REID 3,566,265

COMPENSATED STEP RAMP DIGITAL VOLTMETER

Filed Nov. 18, 1968 2 Sheets-Sheet 1

INVENTOR.
Samuel Cameron Milton Reid
BY Flehr, Hohbach, Test, Albritton & Herbert
Attorneys Feb. 23, 1971 S. C. M. REID 3,566,265

COMPENSATED STEP RAMP DIGITAL VOLTMETER

Filed Nov. 18, 1968 2 Sheets-Sheet 2

INVENTOR.
Samuel Cameron Milton Reid
BY Flehr, Hohbach, Test, Albritton & Herbert
Attorneys United States Patent Office 3,566,265

Patented Feb. 23, 1971

3,566,265

COMPENSATED STEP RAMP DIGITAL VOLTMETER

Samuel Cameron Milton Reid, Mountain View, Calif., assignor to Time Systems Corporation, Mountain View, Calif., a corporation of California Filed Nov. 18, 1968, Ser. No. 776,414
Int. Cl. G01r 17/06, 1/00
U.S. Cl. 324—99 4 Claims

ABSTRACT OF THE DISCLOSURE

Digital voltmeter with self-biasing means to provide a high input impedance and substantially eliminate loading of the input signal.

BACKGROUND OF THE INVENTION

This invention relates generally to voltage measuring devices, and more particularly to digital voltmeters.

Heretofore, several techniques have been utilized in digital voltmeters for converting the analog voltage to a digital indication. Because of their complexity, digital voltmeters are particularly susceptible to problems of speed and unreliability. Also, they are subject to inaccuracy due to noise, drift in component values and input impedance. Of the analog-to-digital conversion techniques heretofore known, dual slope integration generally gives the best results as to speed and reliability and elimination of inaccuracies due to noise and component drift. However, with dual slope integrators, the problem of input impedance is particularly acute. Such integrators generally include an integrating operational amplifier connected directly to the input signal. All but the most complex and expensive operational amplifiers require an input biasing current. Unless preventive measures are taken, this biasing current will be drawn from the input signal, thereby introducing error into the voltage measurement. In the past, a buffer stage having a high input impedance has been interposed between the input signal and the integrating amplifier to prevent loading of the input signal. The use of an additional buffer stage is not wholly satisfactory since it involves increased complexity and expense. There is, therefore, a need for a new and improved digital voltmeter having the advantages of dual slope integration and utilizing a minimum of components to provide a high input impedance and prevent loading of the input signal.

SUMMARY AND OBJECTS OF THE INVENTION

The digital voltmeter of the present invention includes an integrating operational amplifier for generating successively two voltage ramps having equal heights and opposite slopes. The slope and height of the first voltage ramp are proportional to the voltage of the input signal, as are the height and duration of the second voltage ramp. Pulses are generated at a standard rate and counted throughout the duration of the second voltage ramp, with the pulse count being converted to a visual digital indication of the input voltage. Means is provided for supplying an input biasing current to the integrating operational amplifier, so the voltmeter has a high input impedance which will not load the input signal.

In general, it is an object of the present invention to provide a digital voltmeter having a high input impedance which will not load the input signal.

Another object of the invention is to provide a digital voltmeter of the above character which is relatively simple and economical to construct.

Additional objects and features of the invention will appear from the following description in which the preferred embodiment is set forth in detail in conjunction with the drawing.

DESCRIPTION OF THE PREFERRED EMBODIMENT

Figure 1:
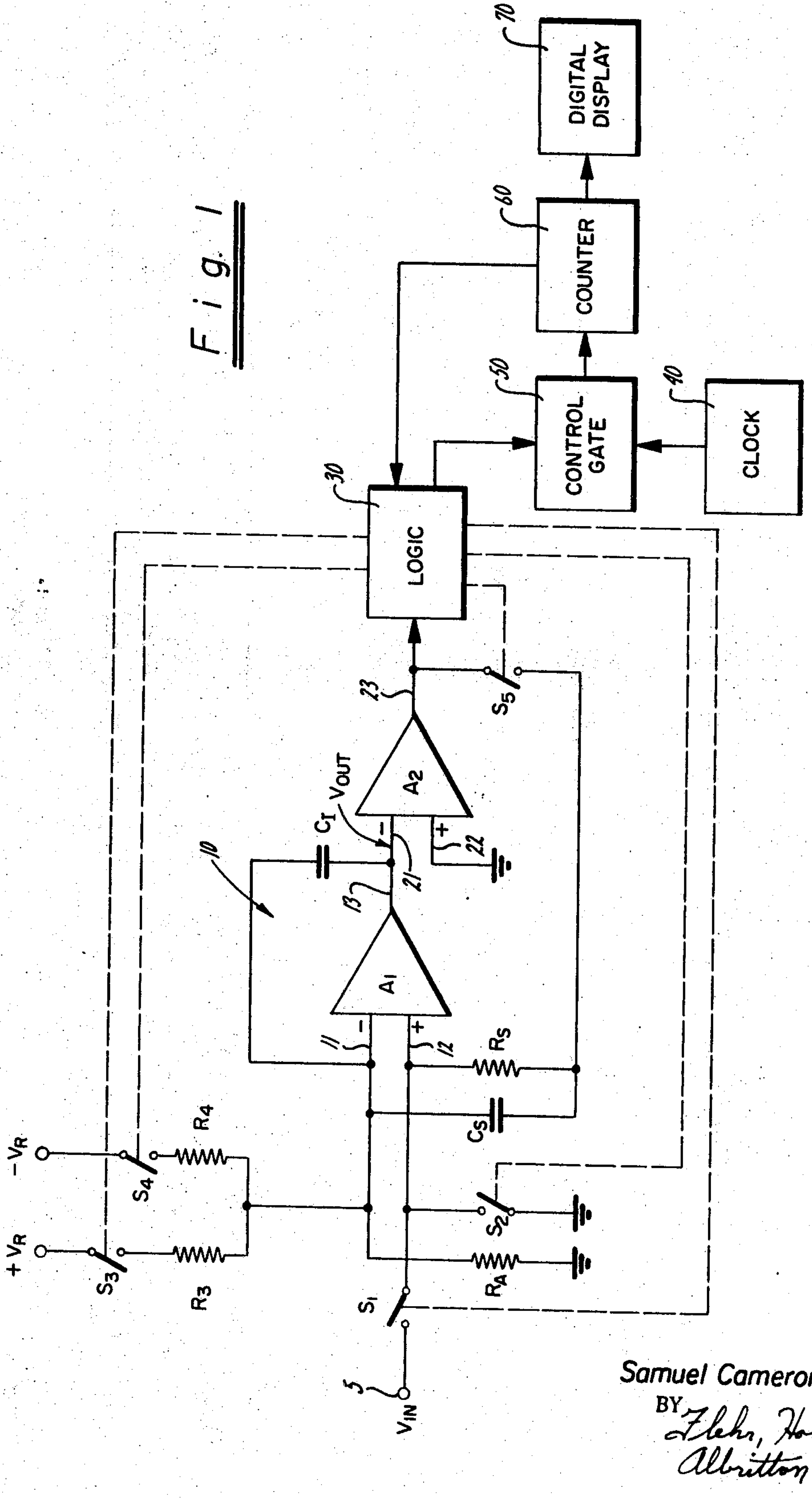
FIG. 1 is a circuit diagram, partially in block form, showing a digital voltmeter with self-biasing means incorporating the present invention.

The compensated ramp digital voltmeter comprises, generally, an input terminal 5, integrator means 10, a zero-crossing amplifier 20, logic means 30, an internal clock 40, a control gate 50, a counter 60, and digital display means 70, interconnected as shown in FIG. 1.

Integrator 10 includes an operational amplifier $A_1$ having an inverting input terminal 11, a non-inverting input terminal 12 and an output terminal 13. An integrating capacitor CI is connected between inverting input terminal 11 and output terminal 13. Non-inverting input terminal 12 is connected to one terminal of switches $S_1$ and $S_2$. The other terminal of switch $S_1$ is connected to input terminal 5, and the other terminal of switch $S_2$ is connected to ground. Thus, when switch $S_1$ is closed, a signal applied to input terminal 5 is connected to terminal 12, and when switch $S_2$ is closed, terminal 12 is grounded.

Means is provided for supplying a reference voltage to inverting input terminal 11 of integrating amplifier $A_1$. This means includes switch $S_3$ and resistor $R_3$ connected in series between a positive reference voltage $+V_R$ and terminal 11 and switch $S_4$ and resistor $R_4$ in series between a negative reference voltage $-V_R$ and input terminal 11.

Zero-crossing amplifier 20 includes an operational amplifier $A_2$ having inverting input terminal 21, non-inverting input terminal 22 and output terminal 23. Inverting input terminal 21 is connected directly to output terminal 13 of integrating amplifier $A_1$. Non-inverting input terminal 22 is connected to ground, and output terminal 23 is connected to logic means 30.

Self-biasing means is provided for supplying input biasing current required by operational amplifier $A_1$ of integrator 10. This means comprises storage capacitor $C_S$ and resistor $R_S$ connected in series between input terminals 11 and 12 of amplifier $A_1$. The junction between capacitor $C_S$ and resistor $R_S$ is switchably connected by means of switch $S_5$ to output terminal 23 of operational amplifier $A_2$. As described hereinafter in detail, this self-biasing arrangement supplies all of the input biasing current required by operational amplifier $A_1$, thereby preventing loading of the input signal even when the input signal is connected directly to the input of operational amplifier $A_1$ through switch $S_1$.

Switches $S_1$–$S_5$ may be conventional electronic switches controlled by logic means 30. The circuitry in logic means 30 for controlling switches $S_1$–$S_5$ includes conventional AND gates, OR gates and flip-flops. Logic means 30 also includes zero-crossing detector means for determining when the output of zero-crossing amplifier 20 passes through zero.

Clock 40 comprises a pulse generator which generates a continuous series of short pulses at a standard frequency. Its output is connected to control gate 50.

Control gate 50 includes a conventional AND gate with the output of clock 40 connected to one of its two input terminals. The other input terminal of the AND gate is connected to logic means 30. Thus, it can be seen that the output of control gate 50 consists of a train of pulses at a frequency corresponding to that of clock 40, the number of pulses being controlled by logic means 30.

The output of control gate 50 is connected to counter 60 where the number of pulses in the pulse train is counted and registered. Counter 60 comprises conventional digital counting means such as decade counting units connected in cascade to provide a multi-digit count. A connection is provided between counter 60 and logic means 30 for supplying a signal to logic means 30 when the count in the counter 60 has reached a given level.

Counts corresponding to the voltage of input signals $V_{IN}$ are transferred from counter 60 to digital display unit 70. In digital display unit 70, these counts are converted to a visual digital display by conventional means such as Nixie tubes.

Operaton of the compensated step ramp digital voltmeter falls naturally into three distinct periods and can best be understood by considering each of these periods separately. The three periods are: (1) a rest period; (2) a sampling period; and (3) a counting period. Switching between the three periods is done by means of switches $S_1$–$S_5$, as controlled by logic means 30.

The rest period immediately precedes the sampling period and serves to prepare the integrator circuitry for the upcoming voltage measurement. During the rest period switches $S_1$–$S_4$ remain open, and switch $S_5$ is closed.

Figure 3:
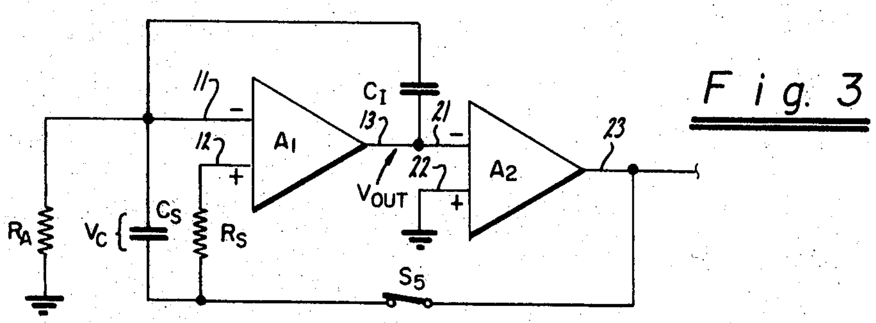
FIG. 3 is a circuit diagram, partially in block form, showing a portion of the circuitry of FIG. 1 during one period of its operation.

As can best be seen in FIG. 3, when switch $S_5$ is closed, the junction between resistor $R_S$ and storage capacitor $C_S$ is connected to output terminal 23 of operational amplifier $A_2$. Thus, operational amplifiers $A_1$ and $A_2$ are connected in a closed loop wherein the output of operational amplifier $A_1$ is connected to the inverting input terminal of operational amplifier $A_2$, and the output of operational amplifier $A_2$ is connected to the noninverting input terminal of operational amplifier $A_1$ through resistor $R_S$. With this closed-loop arrangement, any change in $V_{OUT}$, the ouput voltage of operational amplifier $A_1$, is amplified and reversed in polarity by operational amplifier $A_2$ and fed back to the non-inverting input terminal of operational amplifier $A_1$. This feedback voltage is amplified in operational amplifier $A_1$, and being opposite in polarity to the change in $V_{OUT}$, opposes that change. The effect of the feedback is to bring about a quiescent condition in which the two input terminals of operational amplifier $A_2$ are at substantially the same voltage level. Since the non-inverting input terminal is grounded, this condition exists when $V_{OUT}$ is at or very near zero.

If operational amplifiers $A_1$ and $A_2$ were ideal operational amplifiers, the voltages at all points in the loop would be zero and no current would flow around the loop during this quiescent condition. This is because an ideal operational amplifier requires no biasing current, its output voltage being zero when its input terminals are at eaxactly the same voltage level.

Practical operational amplifiers generally require a biasing current, that is, their output voltage can be zero only when there is a slight, but finite, differences in the voltages applied to their input terminals. As a consequence, during the quiescent condition as small, but finite, current flows around the loop formed during the rest period. This current causes a voltage drop across resistor $R_S$. By making the gain of operational amplifier $A_2$ substantially greater than that of operational amplifier $A_1$, substantially all of the corresponding voltage drop will appear across operational amplifier $A_2$ and not across operational amplifier $A_1$. Where the difference in gains is on the order of an order of magnitude or greater, the difference in voltage between the non-inverting input terminal and the output terminal of operational amplifier $A_1$ is negligible. The voltage difference between the inverting input terminal and the output terminal of operational amplifier $A_1$ is likewise negligible, and the voltage across integrating capacitor $C_I$ is essentally zero.

Since the input terminals of operation amplifier $A_1$ are at substantially the same potential, the voltage drop across resistor $R_S$ appears across storage capacitor $C_S$. By making resistor $R_S$ large, the small voltage difference between the input terminals of operational amplifier $A_1$ is negligible compared to the drop across resistor $R_S$, and capacitor $C_S$ is charged to a voltage very nearly equal to the drop across resistor $R_S$. In the drawing this voltage is designated $V_C$.

The duration of the rest period corresponds generally to the time interval between voltage measurements. These measurements may be made successively at a predetermined rate, or may be made on a "one shot" basis. In either case, the rest period should be at least as long as the transient period required for storage capacitor $C_S$ to charge to its final value $V_C$.

The rest period is terminated and the sampling period initiated by closing switch $S_1$ and opening switch $S_5$, with switches $S_2$–$S_4$ remaining open. This switching is controlled by logic means 30 and may be done in response to an external signal (not shown) applied to logic means 30. This external signal may be one having a repetitive waveform where successive measurements are to be made, or it may be in single pulse where measurements are made on a "one shot" basis. Where successive measurements are made, it is also possible to control the duration of the rest period by means of internal clock 40 and counter 60, rather than using an external signal.

Figures 4, 5:
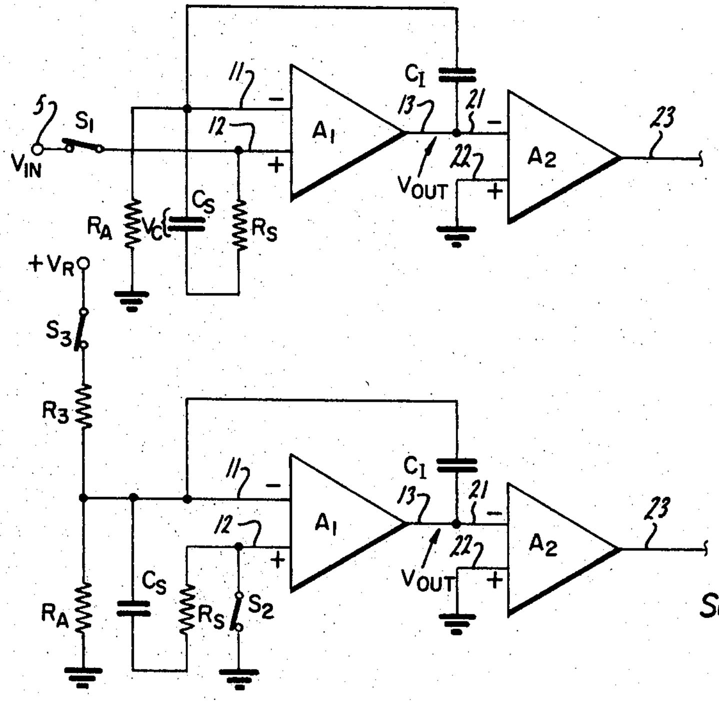
FIG. 4 is a circuit diagram, partially in block form, showing a portion of the circuitry of FIG. 1 during a second period of its operation.
FIG. 5 is a circuit diagram, partially in block form, of a portion of the circuitry shown in FIG. 1 during a third period of its operation.

Operation of the voltmeter during the sampling period can best be understood with reference to FIG. 4. Let it be assumed that an input signal having a positive DC voltage $V_{IN}$ is applied to input terminal 5 and that switches $S_1$ and $S_5$ are thrown to initiate the sampling period at a time designated $T_0$.

Figure 2:
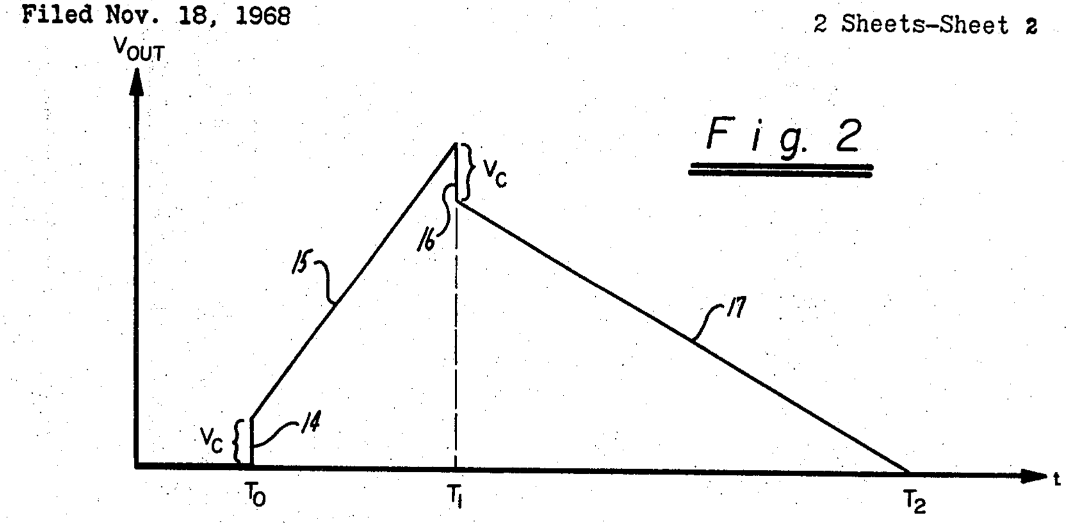
FIG. 2 is a graph showing the voltage at the output of integrating operational amplifier $A_1$ as a function of time.

During the sampling period, storage capacitor $C_S$ and resistor $R_S$ are connected in series between the input terminals of operational amplifier $A_1$. Thus, $V_C$, the voltage on capacitor $C_S$, is applied to the input terminals of operational amplifier $A_1$ through resistor $R_S$. This causes $V_{OUT}$ to rise instantaneously at time $T_0$ by an amount equal to $V_C$ since the voltage across capacitor $C_I$ cannot change instantaneously. This instantaneous rise in $V_{OUT}$ is shown by line 14 in FIG. 2. Throughout the sampling cycle, storage capacitor $C_S$ supplies all input biasing current required by operational amplifier $A_1$. Capacitor $C_S$ and resistor $R_S$ should be made sufficiently large that the charge on capacitor $C_S$ is not appreciably diminished by this current.

Except for the self-biasing action provided by storage capacitor $C_S$ and resistor $R_S$, operational amplifier $A_1$ functions as a conventional integrator during the sampling period. Input voltage $V_{IN}$ is applied to the non-inverting input terminal of operational amplifier $A_1$, and $V_{OUT}$ consists of a voltage ramp, designated 15 in FIG. 2, having a slope proportional to input voltage $V_{IN}$.

The duration of the sampling period is controlled by the circuitry associated with internal clock 40 and counter 60. At time $T_0$ logic means 30 opens control gate 50 and pulses from clock 40 begin to register in counter 60. When a predetermined number of pulses, corresponding to the length of the sampling period, are registered in counter 60, a signal is supplied from counter 60 to logic means 30 which actuates the switches to terminate the sampling period.

During the sampling period, operational amplifier $A_2$ functions as a conventional amplifier. Since $V_{OUT}$ is applied to the inverting input terminal of operational amplifier $A_2$, as voltage ramp 15 increases in a positive direction, the output of operational amplifier $A_2$ increases negatively. The rate of increase in the output is greater than the rate of increase in the input by a factor corresponding to the gain of operational amplifier $A_2$.

At the end of the sampling period, switch $S_1$ is opened and switches $S_2$ and $S_3$ are closed, thereby instituting the counting period. The time at which switching between the sampling period and the counting period occurs is designated $T_1$.

As can best be seen in FIG. 5, during the counting period the two sides of storage capacitor $C_S$ are connected to ground through resistor $R_A$ and resistor $R_S$ and switch $S_2$. Thus, closing switch $S_2$ causes capacitor $C_S$ to discharge through resistors $R_A$ and $R_S$, resulting in a decrease equal to $V_C$ in the voltage at the inverting input terminal of operational amplifier $A_1$. If capacitor $C_S$ is substantially smaller than capacitor $C_I$, this voltage drop will occur too rapidly for capacitor $C_I$ to follow and $V_{OUT}$ will likewise decrease by an amount equal to $V_C$. This decrease is not instantaneous, but occurs exponentially, with a time constant corresponding to the values of capacitor $C_S$ and resistors $R_A$ and $R_S$. By proper choice of the values of these components, the time required for voltage drop can be made negligibly small.

During the counting period, operational amplifier $A_1$ functions as a conventional integrator with positive reference voltage $+V_R$ connected to its inverting input terminal through switch $S_3$ and resistor $R_3$. The output of operational amplifier $A_1$ consists of a voltage ramp, designated as 17 in FIG. 2, having a fixed negative slope determined by reference voltage $+V_R$. Voltage ramp 17 declines from an initial value at time $T_1$ equal to the rise of ramp 15 to a value of zero at time $T_2$. Since the slope of ramp 17 is fixed, the time required for ramp 17 to decline from its initial value to zero is dependent only upon the rise of ramp 15. Thus, this time is proportional to the voltage of the input signal $V_{IN}$.

During the counting period, operational amplifier $A_2$ again functions as a conventional amplifier which amplifies and inverts the voltage $V_{OUT}$ which is applied to its inverting input terminal. Thus, the output of operational amplifier $A_2$ becomes zero at the same time as does $V_{OUT}$, that is, at time $T_2$. However, the output of amplifier $A_2$ changes at a rate which is equal to the gain of the amplifier times the rate at which $V_{OUT}$ changes. Hence, the zero crossing in the output of amplifier $A_2$ is much sharper than the zero crossing of $V_{OUT}$, and it affords a more accurate identification of time $T_2$. The output of amplifier $A_2$ is connected to logic means 30 where it is monitored by a zero-crossing detector.

During the counting period, pulses from clock 40 are registered in counter 60, the number of pulses being proportional to the length of the counting period and, hence, to the voltage of input signal $V_{IN}$. At time $T_1$ logic means 30 opens control gate 50, and pulses from clock 40 begin to register in counter 60. These pulses continue to register until time $T_2$ when logic means 30, in response to the zero crossing in the output of operational amplifier $A_2$, closes control gate 50. At this point the count in counter 60 is transferred to digital display means 70 where it is converted to a visual display of the value of the input voltage.

Where successive voltage measurements are to be made, the rest period associated with the next succeeding voltage measurement can begin immediately after time $T_2$.

If a negative input voltage is connected to input terminal 5 instead of a positive input voltage, the operation of the voltmeter will be substantially as described heretofore, although the polarity and slopes of ramps 15 and 17 will be reversed. Also, during the counting period, $S_4$ will be closed instead of $S_3$, thus connecting a negative reference voltage $-V_R$ to the inverting input terminal of operational amplifier $A_1$ through resistor $R_4$. The choice between the positive and negative reference voltages is made by logic means 30 in response to the polarity of the voltage at the output of operational amplifier $A_2$ and time $T_1$.

Switching between the sampling period and the counting period can be greatly simplified by making the duration of the sampling period correspond to a maximum count in counter 60, thereby eliminating the need to reset the counter between the two periods.

From the foregoing, it is apparent that a new and improved digital voltmeter has been provided. As with most digital voltmeters employing integration, good noise rejection can be accomplished without the use of input filters. Also, the double ramp approach eliminates essentially all errors associated with drift in components such as integrating capacitor $C_I$, operational amplifiers $A_1$ and $A_2$, and clock 40, since all these components are used in the generation of both ramps. In addition, self-biasing means is provided for the integrating operational amplifier, thereby providing the voltmeter with a high input impedance and eliminating errors due to loading of the input signal.

I claim:

1. A digital voltmeter comprising an input terminal for receiving an input signal, integrator means, means for switchably connecting the integrator means to the input terminal, biasing means associated with the integrator means for providing the integrator means with a high input impedance and serving to prevent loading of the input signal by the integrator means, said integrator means including an operational amplifier, said biasing means including a network connected to said operational amplifier, said network including at least one capacitive element for receiving and storing electrical charge during a period when the integrator means is not connected to the input terminal for releasing stored charge in the form of biasing current to the operational amplifier when the input terminal is connected to the integrator means said integrator means generating a first voltage ramp having a slope and height proportional to the magnitude of the voltage of the input signal and thereafter generating a second voltage ramp equal in height and opposite in polarity to said voltage ramp, said second voltage ramp having a predetermined slope independent of the input signal and a duration proportional to the magnitude of the voltage of the input signal, and digital means connected to the integrator means responsive to the duration of the second voltage ramp for computing and displaying the voltage of the input signal.

2. A digital voltmeter as in claim 1 wherein stored charge is delivered from the capacitive element to the operational amplifier at a rate sufficient to supply all biasing current required by the operational amplifier, so that no current is drawn from an input signal applied to the input terminal.

3. A digital voltmeter as in claim 1 wherein said operational amplifier includes inverting and non-inverting input terminals and said network includes a capacitor and a resistor connected in series between the input terminals of the operational amplifier.

4. In a digital voltmeter an input terminal for receiving an input singal, integrating operational amplifier means, means for switchably connecting the integrating operational amplifier means to the input terminal, biasing means including a capacitor connected to the integrating operational amplifier means for receiving and storing electrical charge during a period when the input terminal is not connected to the integrating operational amplifier means and for releasing stored charge in the form of biasing current to said operational amplifier means when the input terminal is connected thereto, whereby all biasing current required by the operational amplifier means is supplied by the capacitor rather than being drawn from the input signal, said integrating operational amplifier means generating a first voltage ramp having a slope and height proportional to the magnitude of the voltage of the input signal and thereafter generating a second voltage ramp equal in height and opposite in polarity to said voltage ramp, said second voltage ramp having a predetermined slope independent of the input signal and a duration proportional to the magnitude of the voltage of the input signal, and digital means connected to the integrating operational amplifier means responsive to the duration of the second voltage ramp for computing and displaying the voltage of the input signal.

References Cited

UNITED STATES PATENTS

| | | | |
|---|---|---|---|
| 3,051,939 | 8/1962 | Gilbert | 324—99X |
| 3,087,147 | 4/1963 | Norris et al. | 324—111X |
| 3,368,149 | 2/1968 | Wasserman | 324—99 |
| 3,458,809 | 7/1969 | Dorey | 324—99 |
| 3,439,271 | 4/1969 | Metcalf et al. | 324—99 |

RULDOLPH V. ROLINEC, Primary Examiner

E. F. KARLSEN, Assistant Examiner

U.S. Cl. X.R.

324—111; 340—347